United States Patent [19]

Levy

[11] 4,254,089

[45] Mar. 3, 1981

[54] PRODUCT RECOVERY FROM ALKALI METAL WASTES

[75] Inventor: Donald J. Levy, Mountain View, Calif.

[73] Assignee: Lockheed Missiles & Space Company, Inc., Sunnyvale, Calif.

[21] Appl. No.: 89,082

[22] Filed: Oct. 29, 1979

Related U.S. Application Data

[62] Division of Ser. No. 849,975, Nov. 9, 1977.

[51] Int. Cl.³ .............................................. C01D 1/04
[52] U.S. Cl. .................................... 423/179; 423/641
[58] Field of Search ....................... 423/641, 179, 180

[56] References Cited

U.S. PATENT DOCUMENTS

| | | | |
|---|---|---|---|
| 2,660,517 | 11/1953 | Padgitt | 423/641 |
| 2,880,065 | 3/1959 | King et al. | 423/641 |
| 4,032,614 | 6/1977 | Lewis | 423/641 |
| 4,032,615 | 6/1977 | Johnson | 423/641 |

Primary Examiner—Wayne A. Langel
Attorney, Agent, or Firm—Richard H. Bryer

[57] ABSTRACT

A method and apparatus for safely and economically converting sodium sludge and other dangerous wastes containing metallic sodium, lithium and potassium into products of economic value. The process reacts solid or molten wastes with an aqueous solution to yield products of the metal hydroxides, hydrogen gas and waste heat while consuming only water. Both scrap sodium and sodium sludge are acceptable feedstocks for this unique float/spray process.

7 Claims, 1 Drawing Figure

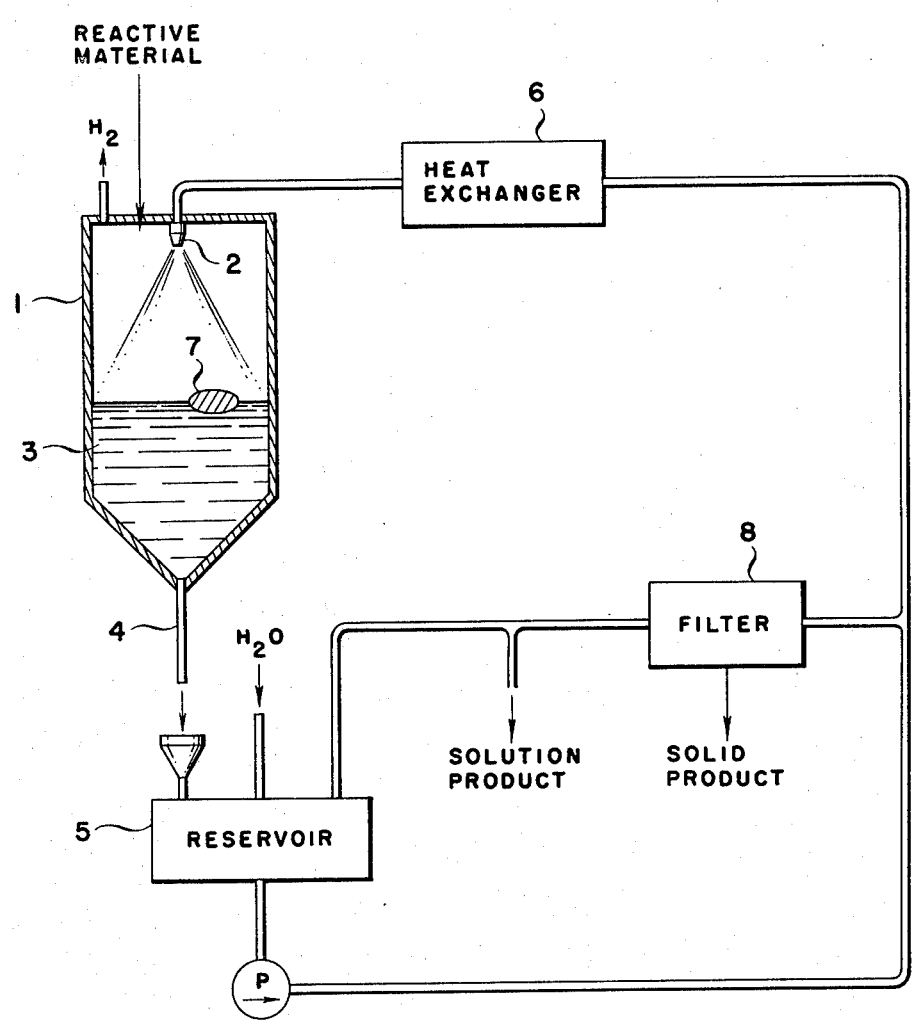

4,254,089

PRODUCT RECOVERY FROM ALKALI METAL WASTES

This is a division of application Ser. No. 849,975, filed Nov. 9, 1977.

BACKGROUND OF THE INVENTION

This invention relates to a safe, economical process for converting sodium sludge and other dangerous wastes containing metallic sodium, lithium and potassium into products of economic value. Waste materials containing metals, such as sodium, potassium, lithium and calcium are quite hazardous because of their high chemical reactivity with water and the danger of explosive reactions. These metals react readily with ambient atmospheric moisture to liberate hydrogen gas and much heat. The reaction of sodium, for example, is sufficiently exothermic to result in ignition or explosion of the hydrogen gas and ignition of the sodium metal. Disposal of wastes containing these metals has been a problem. Small quantities are burned. Large quantities, such as the waste sodium sludge from a Down's cell, are undesirably dumped at sea. The principal metal waste in the sodium industry is the sodium sludge containing typically about 70 percent sodium, 20 percent calcium and 10 percent oxides and chlorides of sodium and calcium by weight.

It is economically attractive to react the waste metals with an aqueous solution and methods have been proposed. U.S. Pat. No. 2,527,443 describes a method for introducing sodium sludge into the lower portion of an upflowing stream of an aqueous sodium hydroxide solution. Applicant has found that this method is technically unsound and results in violent explosions as the reacting sludge rises in the vertical column. The invention has not been adopted for industrial use.

Essentially pure, solid sodium can be reacted with flowing water. British Pat. No. 574,360 describes a nozzle with a center feed of sodium in rod form which is contacted with a surrounding flow of water. This method necessitates the use of solid metals in rod form. Water flow removes the reaction heat and prevents the sodium from melting and causing an explosion. Tests conducted by applicant show that sodium sludge could not be reacted in such an apparatus even if it were in solid rod form. Its reduced thermal conductivity prevents effective heat removal by a flowing aqueous solution and melting occurs even at high liquid-solid interfacial velocities.

U.S. Pat. No. 2,660,517 describes a method of reacting liquid sodium (or sodium sludge) with wet steam. The liquid sodium is floated on a pool of molten anhydrous sodium hydroxide at 325° to 700° C. Steam containing 10 to 25 percent liquid water is bubbled up through the sodium hydroxide to react with the liquid sodium and form more anhydrous sodium hydroxide. It is claimed that the reaction heat is absorbed by vaporizing entrained water. The thermal regime of this process appears to be dangerously close to violent conditions. Liquid sodium will burn in water vapor. If the flow of water vapor stops, an explosion occurs (R. N. Newman, A. R. Pugh and C. A. Smith, Conference on Liquid Alkali Metals, British Nuclear Energy Society, 1973). Heat from the reaction of water vapor with liquid sodium tends to raise the sodium surface to its boiling point (883° C.) where the reaction becomes even more exothermic. Explosions are associated with sodium in a dispersed state at its boiling point.

There is a definite need for a process whereby the more reactive alkali and alkaline earth metals can be converted safely and economically into their respective hydroxides. There is particular need for a method to convert waste sodium sludge and scrap sodium into economically useful hydroxide solutions and to eliminate the pollution of ocean dumping.

SUMMARY OF THE INVENTION

Briefly, in accordance with the invention, there is provided a safe, effective and economical process for converting sodium sludge and wastes containing sodium, lithium and potassium metals into their respective metal hydroxides. The metals are converted without the need to supply heat energy.

More particularly, in accordance with the invention, it has been discovered that the reaction between the metal and water is safely conducted only when there is a relative flow between the two substances and the reaction heat is carried off by a solution having a reduced activity of water. The liquid metal is floated on a bath of the solution which cools the underside of the metal. The topside of the metal, floating in an essentially oxygen-free atmosphere, is cooled by a spray of the solution.

BRIEF DESCRIPTION OF THE DRAWING

The invention may be more easily understood from the following description and accompanying drawing which is a schematic view of an apparatus for processing reactive metal in accordance with the invention.

DESCRIPTION OF THE PREFERRED EMBODIMENTS

There is a large amount of heat evolved when reactive alkali and alkaline earth metals react with aqueous solutions. Previous methods to react such metals with aqueous solutions have been unsuccessful because of a failure to provide an efficient means of removing the heat of reaction which can cause explosions even in the absence of oxygen. The reaction between reactive metals and aqueous solutions is conducted safely only when there is a relative flow between the two substances and the reaction heat is carried off by the solution. When there is little or no relative flow, the large amount of reaction heat liberated at the surface of the metal causes the metal to reach high temperatures and the local formation of steam. The fast metal-steam reaction heats the metal to its boiling point and the reaction rapidly accelerates into an explosion.

The alkali and alkaline earth metals are all reactive with water to form the respective metal hydroxides. Sodium is one of the more reactive metals in this group. It is desirable to slow the reaction so that heat is evolved at a controllable rate. This can be accomplished by reducing the activity of water in an aqueous solution. It is the preferred method of this invention to reduce the activity of water with a high concentration of the hydroxides of the particular reactive metal. The cations of these metals coordinate strongly with water molecules to reduce water activity. The selection of a particular hydroxide will depend upon the specific metal being reacted and the desired use of the product solution formed. Sodium hydroxide solution is a good starting material for reacting sodium sludge and scrap sodium because it is very soluble, inexpensive, very effective and it does not contaminate the product formed.

British Pat. No. 574,360 shows that a flow of water across a solid sodium surface prevents melting of the sodium. Applicant has found that the reaction heat is easily removed from the reacting surface of solid sodium metal by a sodium hydroxide solution at a low flow rate and the sodium does not melt despite its low melting point of only 98° C. For example, a 50 percent by weight sodium hydroxide solution at 50° C. effectively prevented melting and any hazardous reaction at an interfacial velocity of only 0.3 cm sec$^{-1}$. However, this same solution when cooled to 30° C. and flowed at velocities up to 10 cm sec$^{-1}$ would not prevent melting of sodium sludge to form liquid sodium. Sodium sludge will always melt due to its poor thermal conductivity.

Various means of flowing the aqueous solution past liquid sodium (from reacting sodium sludge) were considered before a suitable method was discovered. The liquid sodium is floated on a solution of concentrated sodium hydroxide which cools the underside of the sodium. The topside of the reacting sodium (floating in an oxygen-free atmosphere) is cooled by a spray of solution from above which also flows past the underside.

A digester for processing reactive metal is illustrated schematically in the drawing. The cylindrical chamber (1) is fitted with a full-cone spray nozzle (2) at the top. The level of hydroxide solution (3) is maintained constant by means such as a vented weir pipe (4) which drains into a reservoir (5). Solution (3) from the reservoir is pumped through a heat exchanger (6) to remove reaction heat and then returned to the spray nozzle (2). Air initially in the headspace of chamber (1) is purged by a gas such as nitrogen that is inert with the metal. Reactive metal in solid or liquid form is fed into the headspace of chamber (1) through a port, not shown. Alternately, solids may be added beneath the solution by a tube and plunger, not shown. The metal (7) which is fed into chamber (1) reacts while floating as depicted on the solution surface. Evolved hydrogen gas is vented from chamber (1) through a water trap, not shown, to maintain the headspace free of oxygen. Water is added to the system, for example, to reservoir (5) through a port, not shown, to maintain the metal hydroxide concentration of the solution at the desired value.

If at least one component of the metal feed forms an insoluble reaction product, the process solution then becomes a slurry. For example, the digestion of sodium sludge forms products of soluble sodium hydroxide and insoluble calcium hydroxide. When a solid product is formed, a filter (8) may be placed in the system to separate the solid calcium hydroxide and the sodium hydroxide solution. Slurry from reservoir (5) is processed through the filter which separates and discharges the solid product. A portion of the hydroxide solution is discharged with the solid product, with the remainder of the filtrate flowing back into the reservoir (5). A rather constant volume is maintained in the system by removing product solution from the system as depicted.

The filter also serves another purpose when a slurry is processed. For example, the sodium sludge from a Down's cell normally contains a high ratio of calcium to sodium and the slurry formed by reaction with water is too viscous to pump easily. The slurry is not easily recirculated in the digester system if the calcium content appreciably exceeds 4.0 weight percent. The problem was overcome by adding carbonate salts, for example $Na_2CO_3 \cdot H_2O$, to reservoir (5) in amounts of 20 to 100 percent of the stoichiometric quantity required to convert calcium to calcium carbonate. The surface of the calcium hydroxide solids is converted to crystalline calcium carbonate and the solids are then easily filtered by filter (8).

An alternate mode can be used to process sodium sludge or other calcium-containing residues without the use of a filter if a supply of waste sodium hydroxide solution is readily available. Chlor-alkali plants often have waste alkali available which is used for acid neutralization. In this mode, the viscosity due to the calcium content of the system solution is controlled by adding sodium hydroxide solution to the reservoir (5) along with the required water addition. The product, calcium hydroxide-calcium carbonate slurry, is suitable as is for acid neutralization.

When sodium sludge and scrap sodium is digested, a sodium hydroxide concentration of at least 25 weight percent is preferably used because lower concentrations become increasingly reactive. A sodium hydroxide concentration up to about 50 weight percent is suitable since at higher concentrations the solution increasingly tends to solidify at ambient temperature. A concentration range of 25 to 50 weight percent is also preferred when solutions of lithium hydroxide and potassium hydroxide are used. The particular concentration to be used, however, is readily ascertained by routine experimentation.

The digester operates satisfactorily with the solution or slurry at ambient temperature. While this is not the preferred operating temperature, it is suitable for a cold start and the reaction heat can be used to bring the solution up to a normal operating temperature near 50° C. Solution temperatures up to 90° C. or more can be used provided that the solution maintains the surface temperature of the liquid reactive metal several hundred degrees below its boiling point, preferably at least 200° C. below the boiling point.

The spray flow is used to cool the reacting metal and therefore there is a direct relationship between the sodium sludge feed rate and the solution spray needed for cooling the dissolution reaction. A ratio of spray flow to sludge feed of 0.25 to 0.30 liters per gram is very satisfactory. Dissolution takes place peacefully and without popping or light emission. As the flow is reduced further, occasional yellow flashes and popping are observed. An almost continuous yellow glow exists across the solution surface at a flow/feed rate of 0.13, a safe but undesirable burning condition. Ratios above 0.30 are entirely satisfactory but increase the costs associated with operating the system. Generally, it is convenient to use similar ratios for the other reactive metals processed by the invention and adjust the reactivity of the solution to compensate for the reactivity of the metal being processed. Alternatively, the flow/feed ratio and solution temperature can be adjusted to compensate as discussed above for the reactivity of the metal being processed.

The process is capable of digesting residues containing more than trace amounts of sodium, lithium or potassium metal separately or in combination up to 100 percent pure metal. Residues produced in the manufacture of sodium normally contain 25 to 95 percent by weight sodium and 0 to 30 percent by weight calcium.

Several examples are given to illustrate the use of the process to digest reactive metals.

EXAMPLE 1

A 16-cm diameter digester was fitted with a pipe for feeding solids. The pipe extended from the top of the chamber to below the solution level. A plunger was used to force the solids out the bottom end of the immersed pipe. A 50 percent by weight solution of sodium hydroxide at 25° C. was sprayed into the chamber at the rate of 3.6 l/min. A 15-g piece of sodium sludge was added and digested. Flow rate was increased to 7.2 l/min. and a 25-g piece of sodium metal was digested. Other pieces of solid sodium and sludge were digested at solution temperatures from 15° C. to 60° C. with spray flows up to 17 l/min.

It was found that the metal dissolution proceeded in a tranquil, controlled manner without explosions when the process of the present invention was used. Conversely, reactive materials such as sodium and sodium sludge would burn with a visible flame, emit white NaOH smoke (due to sodium reduction of water) and explode when the cooling spray was discontinued.

EXAMPLE 2

The digester described in Example 1 was continuously fed with sodium sludge at a rate of 40 g/min. with solution temperatures of 40° to 60° C.

EXAMPLE 3

Solid lithium metal was fed into the digester described in Example 1 and was reacted in a very satisfactory manner. Since lithium is less reactive than sodium, the water activity of the sprayed solution was increased by lowering the NaOH concentration below 30 percent by weight.

EXAMPLE 4

An electrically heated feed pot was mounted about a 38-cm diameter digester. Sodium sludge was melted and fed into the digester at rates of 20 to 200 g/min. The temperature of the molten sludge was varied from 105° to 225° C. Solutions of sodium hydroxide in the range of 30 to 51 percent by weight at 15° to 62° C. were sprayed at rates of 25 to 130 l/min.

EXAMPLE 5

Solid potassium was fed into the digester described in Example 1 and was reacted in a very satisfactory manner. Since potassium is more reactive than sodium, the water activity of the sprayed solution was decreased by raising the NaOH concentration to 50 percent by weight.

The process described above relates to a method for converting sodium sludge and other hazardous wastes containing lithium, sodium and potassium metals into materials of economic value. The process is conducted in a safe, controlled manner which avoids explosions. Only water is consumed in this process which results in the production of metal hydroxides, hydrogen and waste heat, all with economic value. Other advantages and uses of the process will become apparent to persons skilled in the art.

What is claimed is:

1. A method for converting at least one reactive material selected from the group consisting of sodium sludge and materials which contain sodium, lithium or potassium metal into its respective metal hydroxide comprising the steps of floating the material on a bath of a metal hydroxide solution which cools the underside of said material, said metal hydroxide being the hydroxide of said reactive material, maintaining an essentially oxygen-free atmosphere in contact with the topside of said material, cooling the topside of said material by a spray of said solution, and maintaining a relative flow between said material and said solution by said spray which flows past the underside of said material.

2. A method in accordance with claim 1 wherein the hydroxide solution maintains said material at a temperature at least 200° C. below its boiling point.

3. A method in accordance with claim 2 wherein said hydroxide concentration is between about 25 percent by weight and 50 percent by weight.

4. A method in accordance with claim 3 wherein the material contains sodium and up to 30 percent by weight calcium.

5. A method in accordance with claim 4 wherein carbonate salts are added to said hydroxide solution in amounts of 20 to 100 percent of the stoichiometric quantity required to convert the calcium hydroxide to calcium carbonate.

6. A method in accordance with claim 1 wherein said material is sodium sludge.

7. A method in accordance with claim 1 wherein said material is at least one material selected from the group of materials which contain sodium, lithium or potassium metal.

* * * * *